United States Patent
Bae et al.

(10) Patent No.: US 8,233,498 B2
(45) Date of Patent: Jul. 31, 2012

(54) METHOD FOR DISTRIBUTING CONTENTION AMONG TERMINALS IN CONTENTION ACCESS PERIOD OF SUPERFRAME

(75) Inventors: Seung Jae Bae, Gyeonggi-do (KR); Hyung Joo Ki, Gyeonggi-do (KR); Min Young Chung, Seoul (KR); Tae-Jin Lee, Gyeonggi-do (KR)

(73) Assignee: Sungkyunkwan University Foundation For Corporate Collaboration, Suwon-si, Gyeonggi-do (KR)

( * ) Notice: Subject to any disclaimer, the term of this patent is extended or adjusted under 35 U.S.C. 154(b) by 155 days.

(21) Appl. No.: 12/034,536

(22) Filed: Feb. 20, 2008

(65) Prior Publication Data

US 2009/0154489 A1    Jun. 18, 2009

(30) Foreign Application Priority Data

Dec. 14, 2007    (KR) ........................ 10-2007-0130681

(51) Int. Cl.
*H04L 12/413*    (2006.01)

(52) U.S. Cl. ........ 370/447; 370/321; 370/337; 370/347; 370/458; 370/461; 370/462

(58) Field of Classification Search .......... 370/310–350, 370/433, 445, 447, 458, 459, 461, 462
See application file for complete search history.

(56) References Cited

U.S. PATENT DOCUMENTS

| | | | |
|---|---|---|---|
| 6,535,503 B1 * | 3/2003 | Toskala et al. | 370/349 |
| 2002/0105970 A1 * | 8/2002 | Shvodian | 370/468 |
| 2003/0103487 A1 * | 6/2003 | Kim et al. | 370/350 |
| 2005/0180377 A1 * | 8/2005 | Muramoto et al. | 370/345 |
| 2006/0105773 A1 * | 5/2006 | Lin et al. | 455/452.1 |
| 2007/0280157 A1 * | 12/2007 | Kwon et al. | 370/329 |
| 2008/0045149 A1 * | 2/2008 | Dharmaraju et al. | 455/39 |
| 2008/0108300 A1 * | 5/2008 | Teng et al. | 455/3.01 |
| 2009/0067389 A1 * | 3/2009 | Lee et al. | 370/336 |

OTHER PUBLICATIONS

IEEE Std 802.15.4-2006, IEEE Standard for Information technology—Telecommunications and information exchange between systems—Local and metropolitan area networks—Specific requirements, Part 15.4: Wireless Medium Access Control (MAC) and Physical Layer (PHY) Specifications for Low-Rate Wireless Personal Area Networks (WPANs), Sep. 8, 2006, 323 pages.

* cited by examiner

*Primary Examiner* — Ricky Ngo
*Assistant Examiner* — Wei-Po Kao
(74) *Attorney, Agent, or Firm* — Blakely, Sokoloff, Taylor & Zafman LLP.

(57) ABSTRACT

Disclosed is a method for distributing contention among terminals in a Contention Access Period (CAP) of a superframe in regard to a Medium (or Media) Access Control (MAC) layer employing a beacon-enabled mode in IEEE 802.15.4 standard. The method includes: dividing the CAP or the superframe into a plurality of sub-periods, all having the same size; receiving an association request message from a relevant terminal; and allocating one of the plurality of sub-periods to the relevant terminal, and transferring information on the sub-periods to the relevant terminal through a beacon frame, by a Personal Area Network (PAN) coordinator.

9 Claims, 6 Drawing Sheets

METHOD FOR DISTRIBUTING CONTENTION AMONG TERMINALS IN CONTENTION ACCESS PERIOD OF SUPERFRAME

CROSS-REFERENCE TO RELATED APPLICATIONS

The present patent application claims priority from Korean Patent Application No. 10-2007-0130681, filed on Dec. 14, 2007.

BACKGROUND OF THE INVENTION

1. Field of the Invention

The present invention relates to a method for distributing contention among terminals in a contention access period of a superframe in regard to a Medium (or Media) Access Control (MAC) layer employing a beacon-enabled mode in IEEE 802.15.4 standard.

2. Description of the Prior Art

A Personal Area network (PAN) corresponds to a concept which contrasts with the widely known Local Area Network (LAN) or Wide Area Network (WAN), and implies that every individual has their own unique network. Namely, a PAN refers to a single network constructed by terminals owned by a single person for the sake of that person's convenience. The concept of constructing a PAN by wireless means as described above corresponds to a Wireless Personal Area Network (WPAN).

In an effort to wirelessly implement a PAN, IEEE 802.15 working group has determined the WPAN as a standard for short-distance wireless networks, and has four Task Groups (TGs) for the IEEE 802.15 working group to administer. IEEE 802.15.1 corresponds to the very well-known Bluetooth, IEEE 802.15.3 and IEEE 802.15.3a correspond to a high-rate WPAN, and IEEE 802.15.4 having the alias "ZigBee" performs a standard job on a low-rate WPAN below 205 kbps.

The IEEE 802.15.4 protocol prescribes a PHYsical (PHY) layer and a Medium (or Media) Access Control (MAC) layer as standards regarding a low-rate wireless PAN. The MAC layer supports a beacon-enabled mode and a beacon-disabled mode. In the beacon-enabled mode, a superframe is prescribed, so as to define a time boundary in accordance with a media access method. A superframe includes a Contention Access Period (CAP), a Contention Free Period (CFP) and an inactive period, end the length of each period is determined by a beacon frame.

Figure 1:
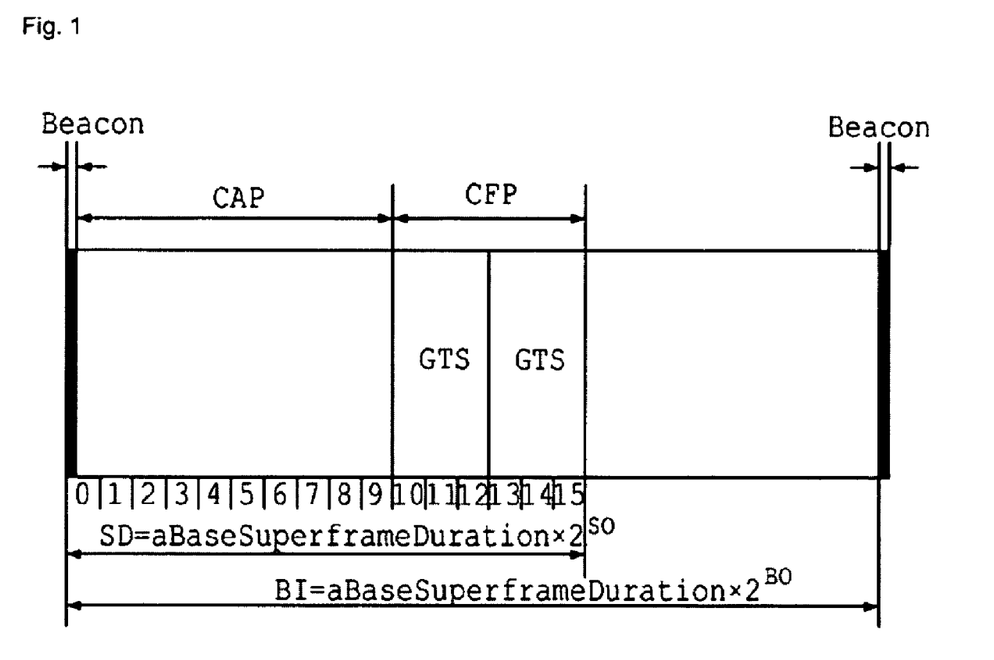
FIG. 1 illustrates a structure of the prior superframe regarding the MAC layer using the beacon-enabled mode in the IEEE 802.15.4 standard.

FIG. 1 illustrates a structure of a conventional superframe regarding the MAC layer using the beacon-enabled mode in the IEEE 802.15.4 standard. A terminal uses a slotted Carrier Sense Multiple Access with Collision Avoidance (CSMA/CA) scheme to gain access to a medium in the CAP of the superframe.

When the terminal has data to be transferred, the terminal first checks through a Clear Channel Assessment (CCA) if the medium is being used by other terminals. If it is found through the first CCA that the medium is not being used by other terminals, the terminal performs the second CCA. At this time, if it is found through the second CCA that the medium is not being used by other terminals, the terminal transfers a frame.

If it is found through a CCA that the medium is being used by other terminals, the relevant terminal performs a backoff process where the relevant terminal waits for an arbitrary period of time, and then performs a CCA again.

The backoff process is as follows. A terminal attempting an initial transfer sets a Backoff Exponent (BE) to macMinBE, sets a Content Window (CW) to '2', initializes the Number of Backoffs (NB) to '0', and then selects an optional backoff counter in the range of $[0, 2^{BE} -1]$. Every time a unit backoff period (i.e., aUnitBackoffPeriod) expires, the terminal reduces the value of the backoff counter by one. Then, a terminal having a backoff counter whose value equals '0' at a starting time point of each unit backoff period performs a CCA. One unit backoff period corresponds to 20 symbols, and time regarding a unit symbol is determined by a relevant PHY layer.

If the terminal fails to perform the CCA, the terminal initialises the CW to '2', and then increases both the BE and the NB by one. The BE has aMaxBE as the upper limit. If the NB is smaller than macMaxCSMABackoffs following an increase thereof, the terminal selects an optional backoff counter in the range of $[0, 2^{BE} -1]$, and then performs a backoff process again. If the NB is larger than macMaxCSMABackoffs, it is determined that the transfer of a relevant frame has failed, and the BE, the CW and the NB are initialised to macMinBS, '2', and zero, respectively.

Figure 2:
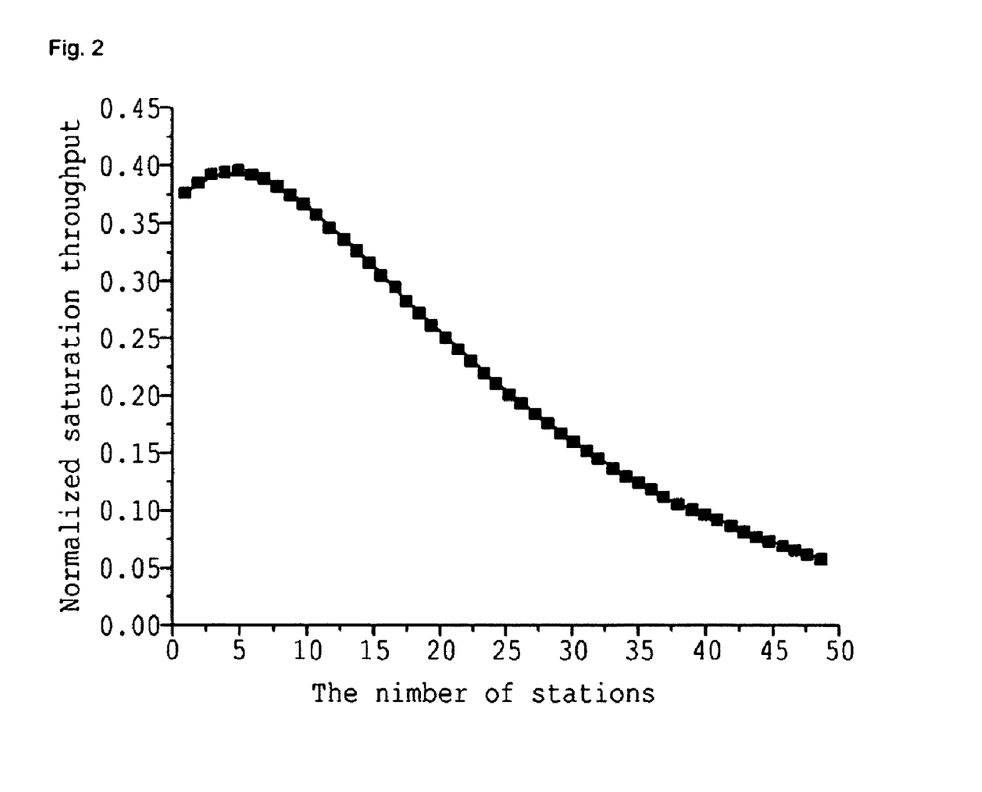
FIG. 2 shows a throughput of a slotted CSMA/CA scheme in accordance with an increase in the number of terminals sharing a medium.

FIG. 2 shows a normalized saturation throughput of a slotted CSMA/CA scheme in accordance with an increase in the number of terminals sharing a medium. If multiple terminals simultaneously transfer frames, collisions occur among the transferred frames, and the more terminals, the larger the probability of the occurrence of collisions. Also, as the number of terminals increases, the period of time for which the terminals possess a medium becomes longer, the probability of failure in a CCA rises, and consequently, the number of transfers which are subject to failure becomes greater. If these factors cause a rise in the number of terminals, the total throughput decreases.

SUMMARY OF THE INVENTION

Accordingly, the present invention has been made to solve the above-stated problems occurring in the prior art, and it is an object of the present invention to provide a method, in which the period for which each terminal gains access by using a slotted Carrier Sense Multiple Access with Collision Avoidance (CSMA/CA) scheme is divided into a plurality of sub-periods according to IEEE 802.15.4 standard, and the relevant terminals are arranged by sub-period in a distributed manner, thereby improving the total throughput and the energy efficiency of each terminal.

In accordance with an aspect of the present invention for achieving the above object, there is provided a method for distributing contention among terminals in a Contention Access Period (CAP) of a superframe in regard to a Medium (or Media) Access Control (MAC) layer using a beacon-enabled mode in IEEE 802.15.4 standard, including the steps of: (a) dividing the CAP of the superframe into a plurality of sub-periods, all having the same size; (b) receiving an association request message from a relevant terminal; and (c) allocating one of the plurality of sub-periods to the relevant terminal, and transferring information on the sub-periods to the relevant terminal through a beacon frame, by a Personal Area Network (PAN) coordinator.

Preferably, in step (a), the CAP of the super frame is divided into a sub-period '0' and a sub-period '1', and the sub-periods '0' and '1' are set in such a manner that the sub-period '0' may begin at the time point a beacon frame ends, and the sub-period '1' may begin at the time point the sub-period '0' ends.

One of the redundant bits of a capability information field in the association request message is used as a Partitioned Contention Access Mechanism Support (PCAMS) bit, thereby enabling the allocation of a sub-period only to each terminal granted the PCAMS.

The above method further includes the steps of: (d) receiving a PAN dissociation request message transferred from the relevant terminal; (e) processing the dissociation of the relevant terminal from the pertinent sub-period, and then reducing the number of terminals in the pertinent, sub-period; and (f) transferring a dissociation ACKnowledgement (ACK) message to the relevant terminal. Preferably, the dissociation request message includes information on the pertinent sub-period to which the relevant terminal belongs.

In accordance with another aspect of the present invention for achieving the above object, there is provided a method for dividing, into a plurality of sub-periods all having the same size, a Contention Access Period (CAP) of a superframe in regard to a Medium (or Media) Access Control (MAC) layer using a beacon-enabled mode in IEEE 802.15.4 standard, and then distributing contention among terminals by using the sub-periods, including the steps of: (g) checking the number of terminals per sub-period, thereby determining if an imbalance among sub-periods related to the number of terminals exists; and (h) giving a relevant terminal notice of the existence of the imbalance among sub-periods related to the number of terminals through a beacon frame if it is determined in step (g) that an imbalance among sub-periods related to the number of terminals exists. Preferably, in steps (g) and (h), a redundant bit of a frame control field is set to a Reset Access Period (RAP) bit, and then the notice is given by using the RAP bit.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

In the present invention, a method for forming sub-periods according to IEEE 802.15.4 standard, a procedure and a management method for arranging terminals in each sub-period in a distributed manner are defined, and to this end, a definition is given of a Partitioned Contention Access Mechanism Support (PCAMS) bit, a connection status field, a connection cancellation factor field, and a Reset Access Period (RAP) bit, which utilize redundant bits of an MAC frame defined in the IEEE 802.15.4 standard.

To this end, the method according to the present invention includes the steps of: forming sub-periods by a Personal Area Network (PAN) coordinator for managing a PAN; specifying, for a terminal newly participating in the PAN, a sub-period in which relevant terminals are arranged, by the PAN coordinator; rearranging, by the PAN coordinator, established terminals operating in the PAN in each sub-period; and managing terminals leaving the PAN.

Hereinafter, advantages, features, and exemplary embodiments of the present invention will be described in detail with reference to the accompanying drawings. In the following description of the present invention, a detailed description of known functions and configurations incorporated herein will be omitted when it may make the subject matter of the present invention rather unclear.

Figure 3:
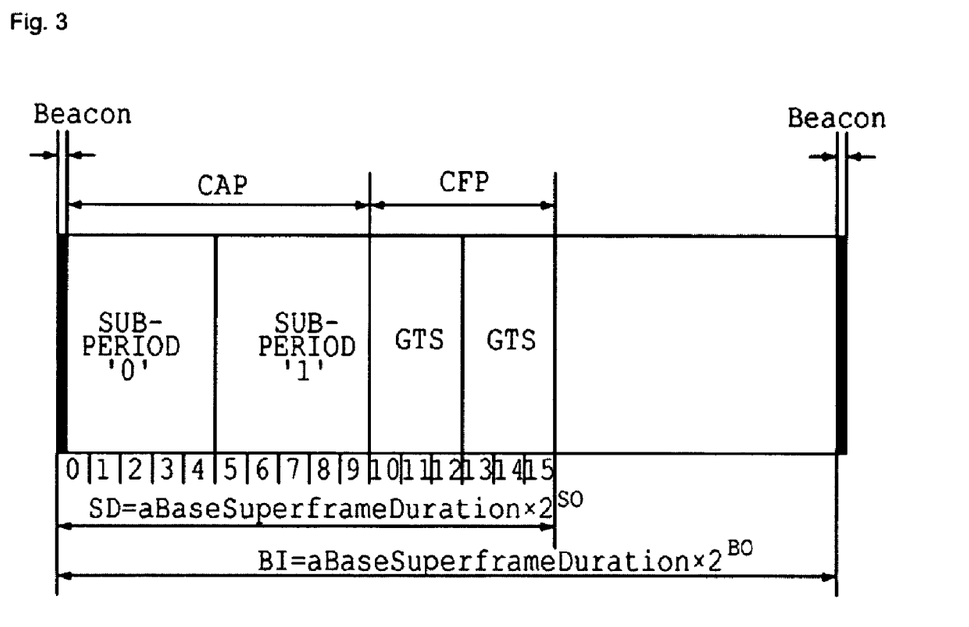
FIG. 3 illustrates a structure of a super frame in accordance with a partitioned contention medium access method employed in the present invention.

FIG. 3 exemplifies a structure of a superframe formed by a coordinator employing the method proposed in the present invention. The PAN coordinator forms two sub-periods, each of which has half the length of an existing CAP, and are referred to as a sub-period '0' and a sub-period '1'. The length of the sub-period equals '$(SD/(2\times16))\times(FinalCAPslot+1)$' symbols, and herein, Superframe Duration (SD) and FinalCAPslot corresponding to values determined by the IEEE 802.15.4 standard are included in a beacon frame. The sub-period '0' begins at the time point the beacon frame ends, and the sub-period '1' begins at the time point the sub-period '0' ends.

Figure 4:
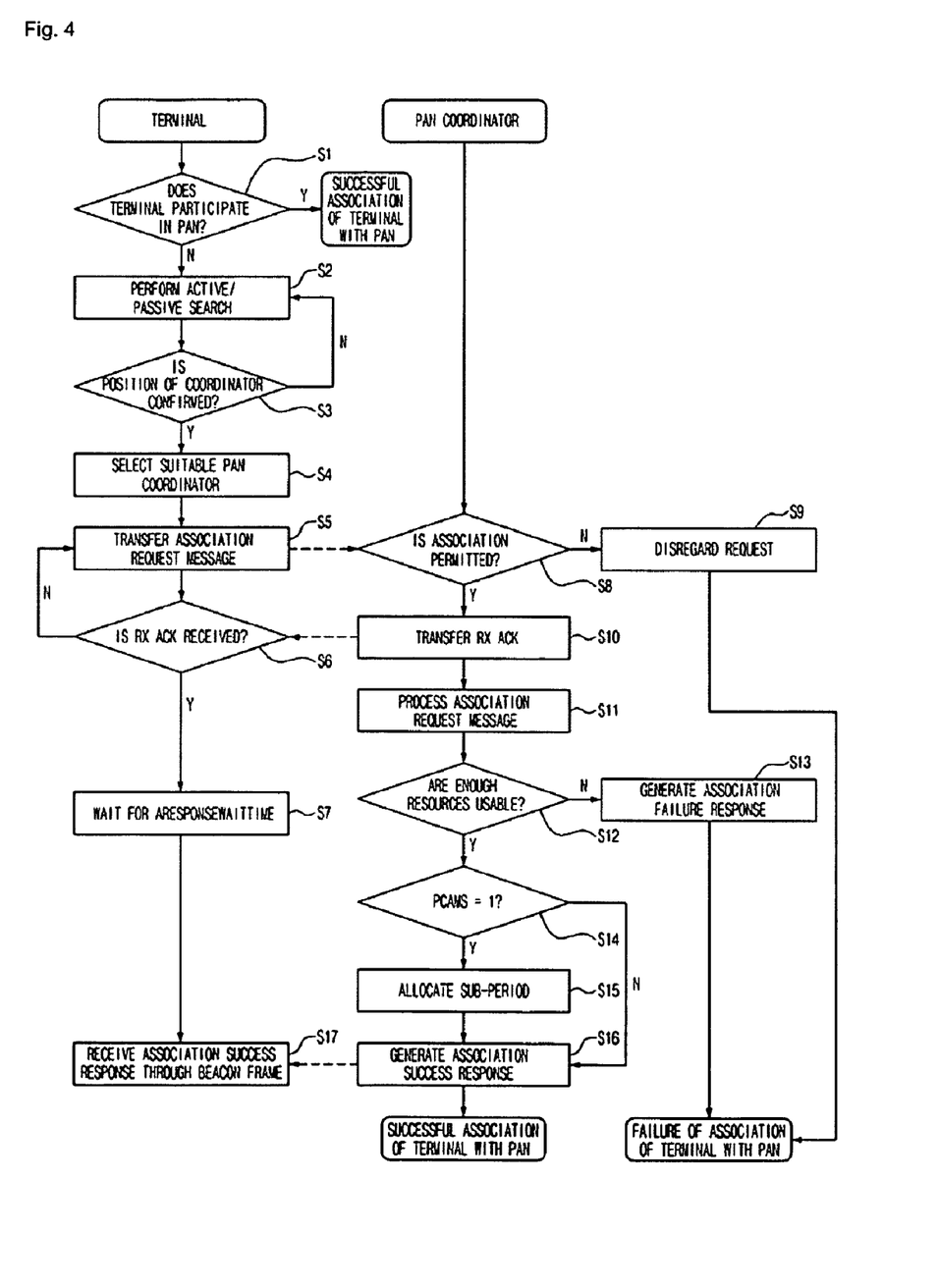
FIG. 4 is a flowchart illustrating a process where a new terminal participates in a PAN.

FIG. 4 is a flowchart illustrating a process where a new terminal participates in a PAN. To begin with, a terminal checks if and in which PAN the terminal itself participates, in an existing situation (S1). If it is checked in step S1 that the terminal does not participate in any PAN, the terminal confirms the existence of a PAN coordinator adjacent to the terminal through a passive search or an active search, collects phyCurrentChannel, macPANId, macCoordShortAddress, and macCoordExtendedAddress of the PAN coordinator through the confirmation of the existence of the adjacent PAN coordinator, and then delivers the collected phyCurrentChannel, macPANId, macCoordShortAddress, and macCoordExtendedAddress of the PAN coordinator to an upper layer (S2). If it is confirmed in step S2 that one or more PAN coordinators exist, the procedure proceeds to step S4. On the contrary, if it is not confirmed in step S2 that one or more PAN coordinators exist, step S2 is performed again (S3).

In step S4, the terminal selects a PAN coordinator having a predefined macPANId among wireless macPANIds of the PAN coordinators acquired in step S2. If two or more PAN coordinators have their respective macPANIds all enabling support, a PAN coordinator is selected by an algorithm for selecting a PAN coordinator, which is determined by the upper layer. The terminal transfers an association request message to the PAN coordinator selected by the algorithm for selecting a PAN coordinator (S5), and then waits for a receive (Rx) ACKnowledegement (ACK) (i.e., an Rx ACK response) regarding the association request message (S6). In the present invention, so as to maintain compatibility with the existing terminals, a Partitioned Contention Access Mechanism Support (PCAMS) bit is specified for the fourth redundant bit included in a capability information field of an association request message. If the scheme of the present invention can be applied to a new terminal, the PCAMS bit is set to '1'. Otherwise, if the scheme of the present invention cannot be applied to the new terminal, or if it is not desired that the scheme of the present invention be applied due to a large amount of data transfer, even though the scheme of the present invention can be applied to the new terminal, the PCAMS bit is set to '0', and then the transfer of an association request message is performed.

The PAN coordinator which has received the association request message refers to an macAccessPermit, and then checks if the PAN coordinator itself permits the new terminal to participate in the PAN (S8). If it is checked in step S8 that the PAN coordinator does not permit the new terminal to participate in the PAN, the PAN coordinator disregards the association request message, and then does not transfer the Rx ACK (S9).

If the PAN coordinator permits the association of the new terminal, the PAN coordinator transfers the Rx ACK to the relevant terminal (S10). Following the transfer of the Rx ACK, the PAN coordinator processes the association request message which has been received in step S5, and then checks if resources corresponding to the request exist (S11 and S12). If resources are not enough, the PAN coordinator generates an association failure response, and then delivers the generated association failure response to the terminal (S13).

If it is determined in step S12 that useful resources exist, the PAN coordinator determines if the association request message includes a PCAMS field equal to '1' (S14).

If it is determined in step S14 that the association request message includes the PCAMS field equal to '1', the PAN coordinator refers to information on the number of terminals per sub-period, and then allocates a suitable sub-period to the terminal (S15). If the association request message includes a PCAMS field equal to '0', step S15 is omitted.

Finally, in order to give notice of a successful association, the PAN coordinator generates an association success response message including a connection status field value defined in the present invention, includes the generated association success response message in a beacon frame broadcasted next time, and then delivers the beacon frame including the generated association success response message to the terminal (S16). While the terminal is sensing the beacon frame for aResponseWaitTime following the reception of the RX ACK (S7), if the terminal confirms the association success response message in the beacon frame, the terminal acts as a member of the PAN (S17).

Figure 5:
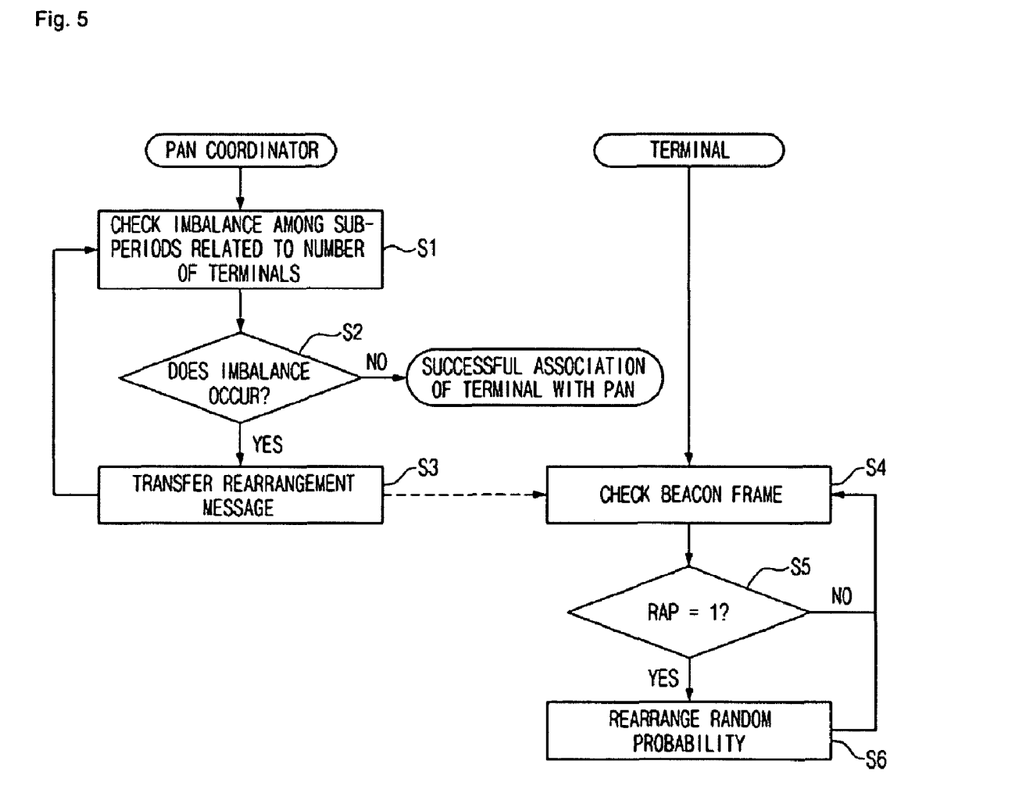
FIG. 5 is a flowchart in which a PAN coordinator rearranges the existing terminals operating in a PAN by sub-period.

FIG. 5 is a flowchart in which a PAN coordinator rearranges the existing terminals operating in a PAN by sub-period. In the PAN managed by the PAN coordinator itself, the PAN coordinator makes a comparison of the number of terminals allocated to each sub-period with one another before the transfer of the beacon frame.

If an imbalance among sub-periods related to the number of terminals occurs with the departure of multiple terminals from a particular sub-period to which they have belonged, the performance difference in accordance with sub-periods is raised, and then an overall performance degradation is caused. In order to avoid performance degradation like this, if an imbalance among sub-periods related to the number of terminals occurs, the PAN coordinator sets an RAP bit of a beacon frame to '1', and then transfers the beacon frame including the RAP bit set to '1.' Next, each of all terminals belonging to the PAN, which receives the beacon frame, selects a sub-period by itself with a probability of ½.

At every time, before the transfer of a beacon frame, the PAN coordinator checks for an imbalance among periods related to the member of terminals per period (S1).

In the beacon frame defined in the present invention, the seventh redundant bit of a frame control field is defined as a Reset Access Period (RAP) bit. If it is determined in step S2 that an imbalance among sub-periods related to the number of terminals exists, the PAN coordinator sets an RAP bit to '1', and then transfers a rearrangement message (S3).

Whenever the terminal receives the beacon frame, the terminal checks the RAP bit of the beacon frame (S4). If the RAP bit equals '1', the terminal optionally selects one of two sub-periods with a probability of ½ (S5 and S6). If the RAP bit equals '0', the terminal checks the next beacon frame (S4 and S5).

Figure 6:
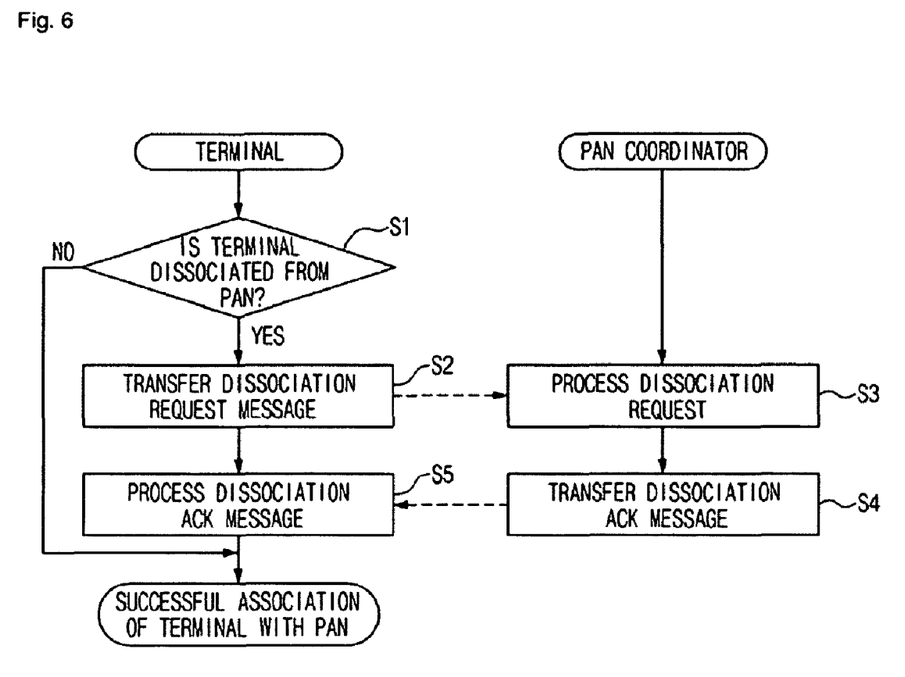
FIG. 6 is a flowchart illustrating a process where a terminal leaves a PAN.

FIG. 6 is a flowchart illustrating a process where a terminal leaves a PAN. The procedure checks if the terminal is to be dissociated from the PAN (S1). If the terminal desires to be dissociated from the PAN, the terminal transfers a dissociation request message to the PAN coordinator (S2). The dissociation request message includes a connection cancellation factor field defined in the present invention. The connection cancellation factor field includes information on which sub-period a terminal trying to be dissociated from the PAN has gained access to a medium in. The PAN coordinator which has received the dissociation request message from the terminal updates information on the number of terminals per sub-period, which is maintained by itself, after processing of the received dissociation request message, and then transfers a dissociation ACK message to the terminal (S3 and S4). The terminal receiving the dissociation ACK message comes to be successfully dissociated from the relevant PAN (S5).

The merits and effects of the method for distributing contention among terminals in a CAP of a superframe with respect to an MAC layer employing a beacon frame in IEEE 802.15.4 standard according to the present invention, will be described as follows.

First, a high stability is secured. Problems raised when the scheme of IEEE 802.15.4 MAC layer is adopted are that the more terminals compete with one another for the possession of a medium, the higher the possibility of the occurrence of collisions, thereby increasing the number of discarded frames. In the present invention, since, with the reduction of the number of terminals competing simultaneously by half, the number of discarded frames decreases, the stability of the network becomes higher.

Second, power consumption can be reduced. As the contention rate decreases, power consumption occurring during the process of unnecessary backoff is reduced. Also, as the period in which terminals compete with one another for the possession of a medium is reduced by half, the operating time of each terminal is also reduced by half. Namely, in a sub-period allocated to no terminals, each terminal enters a sleeping mode, thereby enabling the reduction of power consumption.

Third, throughput is improved. In each of the partitioned sub-periods, the number of competing terminals equals half of that in the existing scheme, and thus the chance for each terminal to possess a medium increases. Accordingly, throughput of a network rises.

Fourth, good compatibility is guaranteed. The operation scheme of the present invention can employ, as they are, the existing terminals which do not use the operation scheme of the present invention, and therefore good compatibility is obtained.

In a PAN or a Wireless Sensor Network (WSN), in which a small amount of resources should be efficiently used, even more efficient and effective communications can be provided owing to the above-described merits and effects.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by the described embodiments thereof but by the appended claims and equivalents of the appended claims.

What is claimed:

1. A method for distributing contention among terminals in a Contention Access Period (CAP) of a superframe in regard to a Medium (or Media) Access Control (MAC) layer using a beacon-enabled mode, the method comprising:
    dividing the CAP of the super frame into a plurality of sub-periods, all having the same size;
    receiving an association request message from a relevant terminal;
    allocating one of the plurality of sub-periods to the relevant terminal, and transferring information on the sub-periods to the relevant terminal through a beacon frame, by a Personal Area Network (PAN) coordinator, wherein the PAN coordinator checks for an imbalance in a distribution of a number of terminals among the sub-periods at regular intervals by comparing a number of terminals allocated to each sub-period with one another; and
    causing a rearrangement of the distribution of the number of terminals among the sub-periods in response to detecting the imbalance.

2. The method as claimed in claim 1, wherein the CAP of the superframe is divided into a sub-period '0' and a sub-period '1.'

3. The method as claimed in claim 2, wherein the sub-period '0' begins at a time point a beacon frame ends, and the sub-period '1' begins at a time point the sub-period '0' ends.

4. The method as claimed in claim 1, wherein one of the redundant bits of a capability information field in the association request message is used a Partitioned Contention Access Mechanism Support (PCAMS) bit.

5. The method as claimed in claim 4, wherein the allocating is performed only for each terminal granted the PCAMS.

6. The method as claimed in claim 1, further comprising:
    receiving a PAN dissociation request message transferred from the relevant terminal;
    processing the dissociation of the relevant terminal from the pertinent sub-period, and then reducing the number of terminals in the pertinent sub-period; and
    transferring a dissociation of acknowledgement (ACK) message to the relevant terminal.

7. The method as claimed in claim 6, wherein the dissociation request message includes information on the pertinent sub-period to which the relevant terminal belongs.

8. A method for dividing, into a plurality of sub-periods all having the same size, a Contention Access Period (CAP) of a superframe in regard to a Medium (or Media) Access Control (MAC) layer using a beacon-enabled mode in a personal area network (PAN), and then distributing contention among terminals by using the sub-periods, the method comprising:
    comparing a number of terminals allocated to each sub-period with one another at regular intervals to determine if an imbalance in a distribution of a number of terminals among the sub-periods exists; and
    causing a rearrangement of the distribution of a number of terminals among the sub-periods in response to detecting the imbalance by giving a terminal notice of the existence of the imbalance through a beacon frame.

9. The method as claimed in claim 8, wherein a redundant bit of a frame control field is set to a Reset Access Period (RAP) bit, and then the notice is given by using the RAP bit.

* * * * *